Feb. 5, 1935.  O. SOLTERBECK  1,990,144
GEARING
Filed Dec. 23, 1931   2 Sheets-Sheet 1

Inventor:
Otto Solterbeck

Feb. 5, 1935. O. SOLTERBECK 1,990,144
GEARING
Filed Dec. 23, 1931  2 Sheets-Sheet 2

Patented Feb. 5, 1935

1,990,144

UNITED STATES PATENT OFFICE 1,990,144

GEARING

Otto Solterbeck, Meiendorf-Rahlstedt, near Hamburg, Germany

Application December 23, 1931, Serial No. 582,813

3 Claims. (Cl. 74—68)

This invention relates to a novel gearing for reversing and speed reducing purposes and consists substantially in that the transmission of the rotary movement from the driving shaft to the driven shaft is effected by cranks or eccentrics.

Several embodiments of the invention are illustrated by way of example in the accompanying drawings in which.

Figure 1:
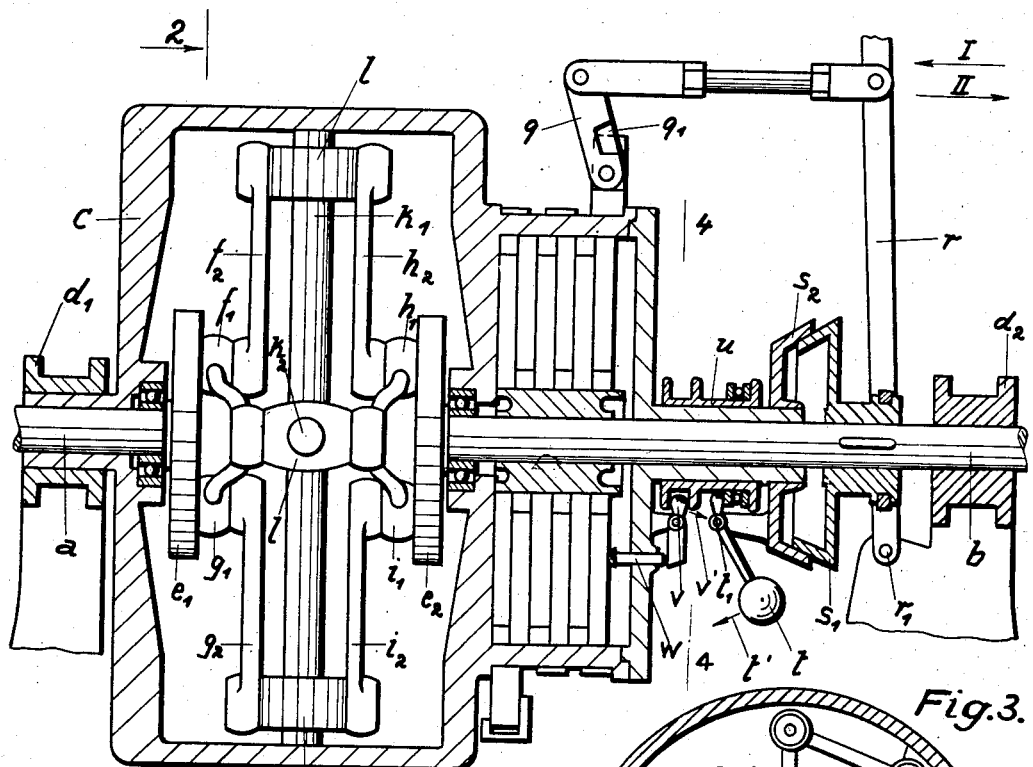
Fig. 1 shows a reversing gear with crank gearings in longitudinal section.
Figure 2:
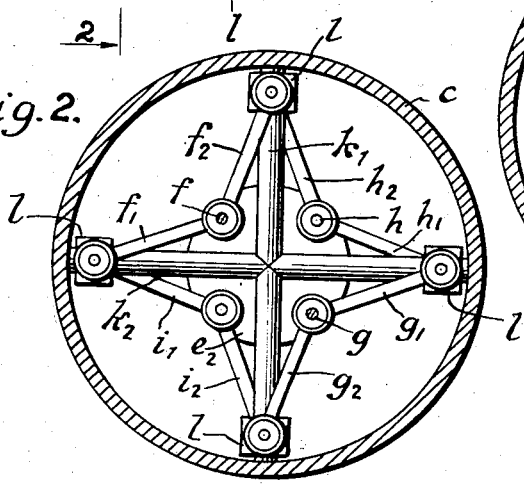
Fig. 2 is a section on line 2—2 of Fig. 1.
Figure 3:
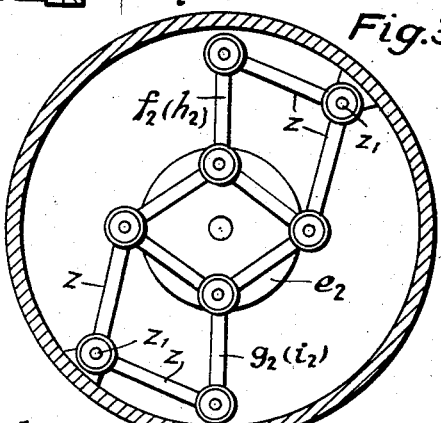
Fig. 3 shows a modified form of crank drive in cross section.
Figure 4:
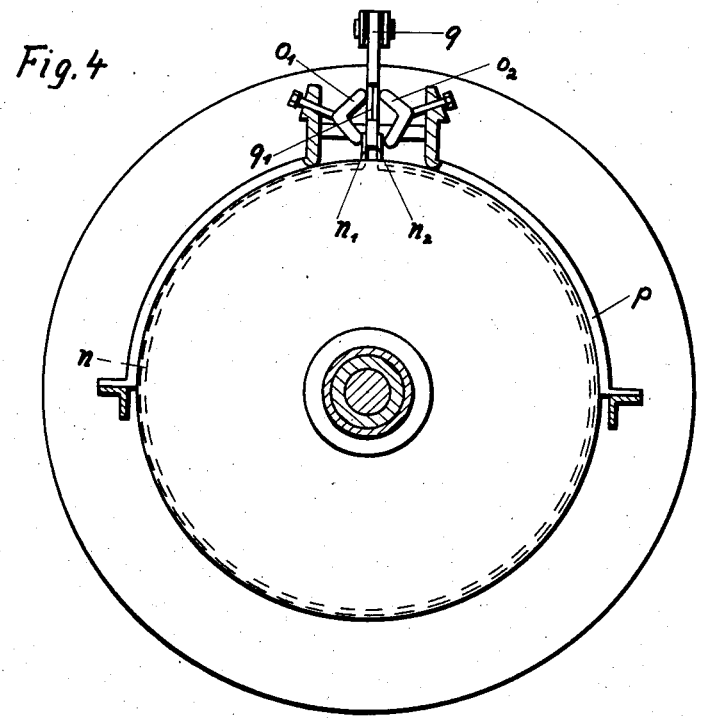
Fig. 4 is a section on line 4—4 of Fig. 1.

In all the figures $a$ represents the driving shaft, $b$ the driven shaft, $c$ a casing which, according to Figs. 1-4, is mounted in bearings $d_1$ and $d_2$ and in which the shafts $a$ and $b$ extend from opposite sides. These shafts carry each in the interior of the casing $c$ cam discs $e_1$, $e_2$ respectively. To each cam disc two pairs of connecting rods $f_1$, $f_2$ and $g_1$, $g_2$ or $h_1$, $h_2$ and $i_1$, $i_2$ are articulated. As shown in Fig. 2, the connecting rods are hingedly connected at their free ends to slide blocks which are shiftable in opposite directions on the arms of a cross $k'_1$, $k_2$ rigidly fixed in the casing $c$. A brake drum $m$ extends from one end of the casing $c$ and is made in one piece with the same. A brake band $n$ laid in spiral shape around the drum $m$ terminates, as shown in Fig. 4, in two opposite upwardly bent ends $n_1$, $n_2$ on which two elbow levers $o_1$, $o_2$ engage, adjustably mounted on a frame $p$. Between the elbow levers $o_1$, $o_2$ a lever $q$ (Fig. 1) is hingedly mounted which has a wedge face $q_1$. This lever $q$ is connected by a rod system to a hand lever $r$ hingedly mounted on a pivot pin $r_1$. When this hand lever is turned in the direction of arrow I the wedge shaped face $q_1$ moves the ends of the levers $o_1$, $o_2$ in outward direction, the one away from the other, so that their other ends move inwards, tighten the brake band and stop the casing $c$. As this stopping for reversing the direction of movement is particularly difficult in large size constructions, an auxiliary clutch is provided as shown in Fig. 1 which operates in the following manner:

If the hand lever $r$ is turned in the direction I, the clutch-half $s_1$, which rotates with the shaft $b$, is pressed into the clutch-half $s_2$, which then also rotates, whereby the weight $t$ fixed on the clutch half $s_2$, is swung out in the direction $t_1$, like the weight of a centrifugal governor. Thus, the toe $t_1$ presses against the sleeve $u$ so that the lever $v$ is oscillated in the direction $v_1$ and a bolt $w$ presses together the laminæ of the clutch. Thus, the casing $c$ is rigidly coupled with the shaft $b$ and rotates therewith, the brake band $n$ being released.

The operation of this reversing gearing is therefore as follows:

If the hand lever $r$ is moved in the direction I, the brake band $n$ is released, the gearing coupled with the shaft $b$ and runs in forward direction with the shaft $a$. If the hand lever $r$ is moved back in the direction II, the brake band $n$ is tightened and the clutch laminæ are released so that the casing $c$ is liberated and the rotation of the driving shaft is transmitted to the shaft $b$ in the opposite direction through the action of the crank drives. As shown in Fig. 2 the pivot pins $f$ and $g$ of the connecting rods $f_1$, $f_2$, $g_1$, $g_2$ of the cam disc $e_1$ not shown are rotated in clockwise direction so that the slide blocks $l$ on the horizontal arm $k_2$ move inwards and those on the vertical arm $k_1$ outwards, whereas the pivot pins $h$ and $i$ of the connecting rods $h_1$, $h_2$ and $i_1$, $i_2$, hingedly connected to the rear cam disc $e_2$, are rotated in anti-clockwise direction.

In order to ensure a mass equilibration in the crank drive, a plurality of pairs of connecting rods are provided as described, the connecting rods hinged to the slide blocks being mutually displaced 180° on the cam disks $e_1$, $e_2$ so that, when for example the connecting rods $f_2$ and $g_2$ of the cam disc $e$ and the connection rods $h_2$ and $i_1$ of the cam disc $e_2$ (Fig. 3) pass through the dead center position, that is are in alignment, the other pairs of connecting rods are not in the dead center position.

Fig. 3 shows a modified construction to ensure mass equilibration in the crank drive. In this instance links $z$ are hingedly connected to the free ends of the connecting rods, their other ends being hingedly connected to the casing at $z_1$. In this instance the reciprocating movement of the slide blocks $l$ being carried out by the suitable hinge points of links $z$ with the rods $f_2$, $h_2$, $g_2$, $i_2$ segment-like around the points $z_1$.

Figure 5:
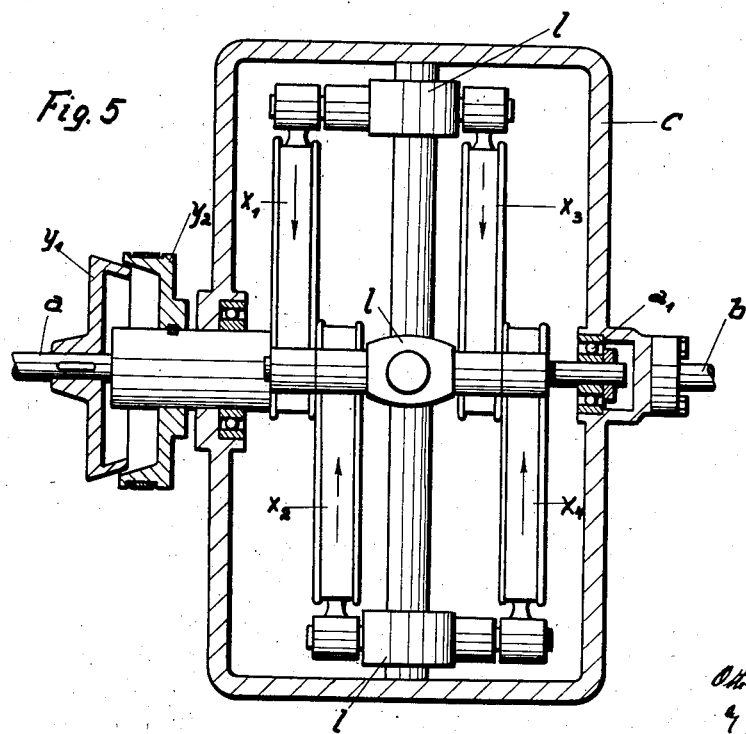
Fig. 5 shows a form of construction of a reducing gearing in which eccentrics are provided instead of connecting rods.

Fig. 5 shows two pairs of eccentrics $x_1$, $x_2$ and $x_3$, $x_4$ instead of the connecting rods, the outer bearing rings of these eccentrics being hingedly connected to the counter running slide blocks $l$. The operation is exactly the same as that of the gearing shown in Figs. 1 and 3. If the hand lever $r$ (Fig. 1) is in its middle position, in which the brake band $n$ is not yet drawn tight, the gearing runs idle, that is the gearing would circulate and the casing $c$, not yet braked, will rotate in the same direction as the driving shaft $a$ but at half the speed thereof. If therefore the driven shaft $b$ is rigidly fixed in the casing $c$, the shaft $b$ rotates at reduced speed according to the crank drive. Such a reduced speed transmission gearing is illustrated in Fig. 5. The shaft $b$ is rigidly mounted in the casing $c$.

On the driving shaft $a$ the clutch half $y_1$ is splined. This shaft runs loosely through a sleeve $a_2$ extending into the casing $c$ and carrying the eccentrics $x_1$ and $x_2$, this driving shaft, after passing through the cross $k_1$, $k_2$ being journalled at $a_1$ in the wall of the casing $c$ to which the shaft $a$ is fixed. The other clutch half $y_2$ is keyed on the sleeve $a_2$ and carries a brake band. When the clutch halves $y_1$ and $y_2$ are out of engagement, no movement will be transmitted by the driving shaft $a$ to the driven shaft $b$, because all the eccentrics can move freely in view of a certain movement on the cross of the casing. If the clutch halves $y_1$, $y_2$ are engaged, the following parts are brought successively into direct connection:—The shaft $a$, clutch half $y_1$ with clutch half $y_2$, sleeve $a_2$ with the eccentrics $x_1$ and $x_2$ and further evidently also the eccentrics $x_3$, $x_4$ on the other side on the shaft. The movement of the casing $c$ resulting therefrom must evidently be equal to that of the driving shaft $a$. The third instance is when the clutch halves $y_1$, $y_2$ are disengaged and the eccentrics $x_1$, $x_2$ are held in connection with the clutch half $y_2$. In this instance the movement of the driving shaft $a$ is transmitted to the eccentrics $x_3$, $x_4$ connected to the shaft $a$ owing to the sleeve $a_2$ and the eccentrics $x_1$, $x_2$. These eccentrics $x_3$, $x_4$ move relative to the stationary eccentrics $x_1$, $x_2$ necessarily with the casing $c$. The movement of the driven shaft $b$ must then be only a fraction of that of the driving shaft $a$. The amount of actual speed at which the shaft $b$ is driven can be varied by braking the clutch half $y_2$ more or less.

I claim:—

1. In a clutch of the character described, a brake drum adapted for support on a gear casing, a brake band on said drum, upright ends on said brake band, adjustable elbow levers between and adapted to press against said ends and a wedge surface adapted to oscillate said elbow levers to tighten or release said brake band.

2. In a clutch of the character described, braking means associated with a gear casing having a driven shaft therein, a wedge lever adapted to actuate said braking means, a two-part clutch between said casing and said driven shaft, and a hand lever connected to said wedge lever and to one part of said clutch adapted to engage said clutch to couple said casing to said driven shaft, and at the same time disengage said braking means.

3. In a clutch of the character described, braking means associated with a gear casing having a driven shaft therein, a two-part clutch between said casing and driven shaft, a centrifugal weight connected to one part of said clutch, a sleeve on said casing, and an elbow lever engaging in said casing adapted to cause contact between the two part clutch element through the shifting of said sleeve due to the centrifugal force exerted by said weight.

OTTO SOLTERBECK.